March 17, 1942.  E. W. CLEVELAND  2,276,466
LANDING WHEEL MOUNTING FOR AIRCRAFT
Filed Jan. 6, 1939
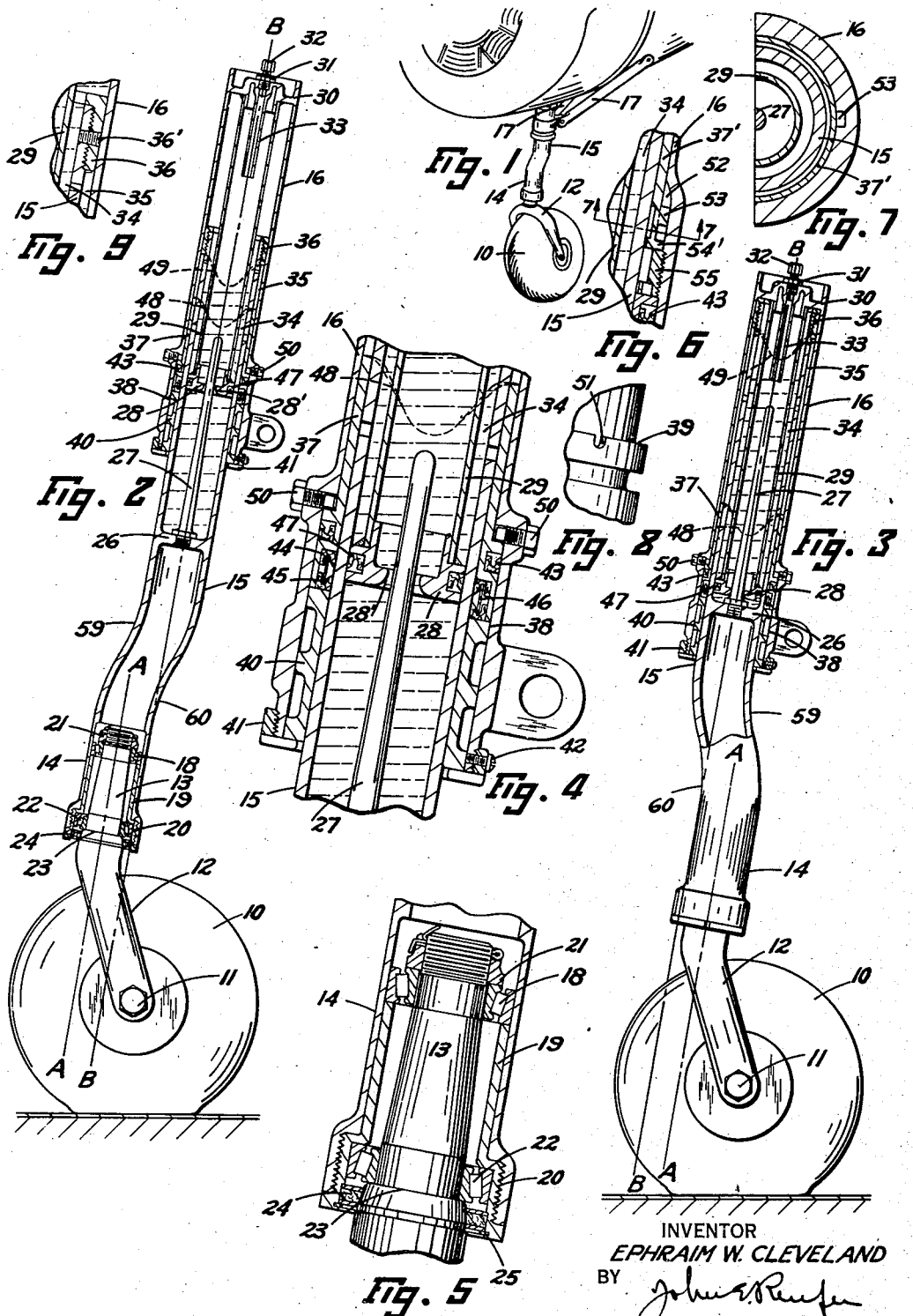
INVENTOR
EPHRAIM W. CLEVELAND
BY
ATTORNEY Patented Mar. 17, 1942

2,276,466

UNITED STATES PATENT OFFICE 2,276,466

LANDING WHEEL MOUNTING FOR AIRCRAFT

Ephraim W. Cleveland, Berea, Ohio, assignor to The Cleveland Pneumatic Tool Company, Cleveland, Ohio, a corporation of Ohio Application January 6, 1939, Serial No. 249,620

5 Claims. (Cl. 244—100)

This invention relates broadly to aircraft, but more particularly to a new and improved nose or tail wheel assembly suitable for use with aircraft.

In application for Patent Serial No. 199,284, filed by Ephraim W. Cleveland and E. Raymond Warner on March 31, 1938, a landing gear is disclosed in which the landing wheel is capable of rotation on two substantially parallel axes. The present construction is an improvement over that construction.

Accordingly, it is one object of this invention to produce a tail or nose wheel support constructed of tubular elements shaped in a manner enabling rotation of the wheel on two substantially parallel axes.

Another object of this invention is to produce a shock absorbing strut for airplanes, the strut being characterized by its lower tubular member which is bent to form an offset portion having operatively mounted therein the spindle of the landing wheel carrying knuckle, the whole assembly forming a compact structure which is strong, durable and efficient.

Other objects and advantages more or less ancillary to the foregoing reside in the specific construction and aggroupment of the elements peculiar to this structure, as will become apparent from a more complete examination of this specification.

In the drawing:

Fig. 1 is a perspective view of the front lower portion of a craft having the invention applied thereto.

Fig. 2 is a side elevational view of one form of the invention, the view being partly in section to show details of the construction.

Fig. 3 is a view similar to Fig. 2 showing the wheel in another position.

Fig. 4 is an enlarged sectional view of a portion of the assembly shown in Fig. 1.

Fig. 5 is an enlarged sectional view of the lower end portion of the shock absorber shown in Fig. 2.

Fig. 6 is a sectional view of a portion of the assembly illustrating a modified construction.

Fig. 7 is a fragmental cross sectional view taken in a plane indicated by line 7—7 in Fig. 6.

Fig. 8 is a fragmental external view of a part shown in Fig. 4.

Fig. 9 is an enlarged sectional fragmental view of the upper portion of the lower cylinder.

Referring to the drawing, 10 represents a landing wheel rotatable on a cross shaft 11 carried by a wheel knuckle 12 having its upper end portion formed with a spindle 13 rotatably mounted within the lower end portion 14 of an inner or lower cylinder 15, which cylinder is slidable and rotatable within an outer or upper cylinder 16 and forms therewith a shock absorber of the hydropneumatic type.

In practice, this upper cylinder 16 is generally rigidly secured to the craft by any suitable means such as braces 17 and may be mounted to support either the nose or tail wheel of the craft.

In order to enable free rotation of the spindle 13 relative to the lower cylinder 15, the lower end portion 14 of the latter is machined to accommodate an upper roller bearing 18 which rests on a sleeve 19 removably secured within the lower end portion of the cylinder 15 by a screw threaded connection 20. The upper end of spindle 13 carries a nut 21 resting on the bearing 18, while the lower portion of the sleeve 19 is enlarged to accommodate another roller bearing 22 operatively engaging the spindle 13 and resting on a shoulder 23 formed thereon. Below the bearing 22 there is mounted a felt washer 24 retained in position by a spring clip 25, which washer closes the lower end of the inner cylinder 15.

Intermittent its end, the cylinder 15 is formed with a partition 26 carrying a tapered metering pin 27 extending upwardly therefrom for slidable movement through the central orifice 28' of a piston 28 carried by the lower end of a piston tube 29 depending from the upper end of the upper cylinder 16 and extending into the inner cylinder 15. As shown, the piston tube 29 may be welded to the head 30 closing the upper end of the upper cylinder 16, which head also accommodates a filler plug 31 and air valve 32 through which non-compressible fluid and compressed air may be admitted into the shock absorber to a level determined by the lower end of a filler tube 33, which tube extends from the head 30 partway into the piston tube 29. In practice, the outside diameter of the tube 29 is materially smaller than the inner diameter of the lower cylinder 15, thereby providing an annular space 34 between the two cylinders closed at its lower end by the piston 28 mounted for slidable engagement with the inner wall of the cylinder 15. Similarly the outside diameter of the cylinder 15 is smaller than the inner diameter of the upper cylinder 16, thereby providing between them an annular space 35 which is closed at its upper end by a head 36 screwed on the upper end of the cylinder 15 for slidable engagement with the inner wall of the cylinder 16, while the lower end of the annular space 35 is closed by a bushing 37 affording a sliding bearing for the cylinder 15. To positively hold the head 36 against rotation relative to the cylinder 15, the head and cylinder are preferably keyed by one or more threaded pipe plugs 36' extending radially therethrough as shown in Fig. 9. In practice, the lower end of the upper cylinder 16 is preferably enlarged by a counterbore 38 on the bottom of which rests an annular shoulder 39 formed on the bushing 37. Below the bushing 37 there is mounted in the counterbore 38 an auxiliary bushing 40 secured therein by a cap 41 screwed on the lower end of the cylinder 16 and held against rotation by a cap screw 42. In order to prevent leakage between the upper cylinder 16 of the bushing 37, the latter carries an external packing 43 preferably of substantially U-shaped cross section having upturned lips affording a fluid tight joint between the bushing and the cylinder. Internally the bushing 37 is machined to accommodate two other U-shaped packings 44 and 45, the former having downturned lips acting as a wiper to prevent admission of dust inside of the shock absorber, and the latter having upturned lips affording a fluid tight joint between the cylinder 15 and the bushing 37. The two packings 44 and 45 are axially spaced by a ring 46 mounted therebetween to prevent endwise movement of the packings. Within the piston 28, there is mounted a similar packing 47 formed with downturned lips affording a fluid tight joint between the piston 28 and cylinder 15 during the compression stroke of the shock absorber.

In order to position the wheel 10 in a fore to aft direction preparatory to landing, there is provided within the shock absorber a self-centering device including a substantially V-shaped cut-away portion within the upper end portion of the bushing 37 forming a cam 48, and a corresponding cam 49 depending from the head 36 secured to the upper end of the cylinder 15. While the craft is in the air, the weight of the wheel 10 together with the expansion of the compressed air within the upper end of the cylinder 16, will cause expansion of the shock absorber and the consequential engagement of the cam 49 with the cam 48, which cams act as a means for limiting expansion of the shock absorber and also for maintaining the two cylinders in a predetermined position calculated to bring the wheel 10 either in the position shown in Fig. 2, or in the position shown in Fig. 3, that is, in a perfect alignment relative to the direction of motion of the craft. To this end, the bushing 37 is held against rotation by cap screws 50 carried by the cylinder 16 and extending into milled slots 51 formed on the bushing 37 adjacent the shoulder 39.

In the modification shown in Figs. 6 and 7, the cylinder 16 is formed with internally milled slots 52 extending upwardly from the bottom of the counterbore 38, which slots are adapted to receive a corresponding key 53 formed on the bushing 37' above its annular flange 54' resting on the bottom of the counterbore 38. In this modified construction, the bushing 37' is held in place by a nut 55 secured within the counterbore 38.

In order to enable rotation of the wheel 10 on two substantially parallel axes, which rotation has been found desirable to prevent shimmy of the wheel, the portion of the tube 15 below the partition 26 is formed with a double bend as at 59 and 60, thereby positioning the spindle 13 in offset relation with respect to the center axis of the shock absorber, and enabling rotation of the wheel 10 on the center axis A—A of the spindle 13, as well as on the center axis B—B of the shock absorber. In practice, the distance between the two axes, that is, the amount of offset, may be limited to a few inches, thereby preventing excessive deflection of the shock absorber which might cause binding of the two cylinders and prevent the free telescoping movement thereof. As shown, the two swiveling axes A—A and B—B are leaning backward relative to the craft. In other words, the angle measured between the rear side of each swivel axis relative to the craft and the ground when the craft rests on the ground is less than 90°, a condition which in practice has been found advantageous in preventing the lateral oscillations or shimmy of the wheel.

In operation, the centering device including the cams 48 and 49 may be so located relative to each other in a manner causing the wheel 10 to either assume the position shown in Fig. 1, wherein the spindle axis A—A is located ahead of the shock absorber axis B—B, or as shown in Fig. 3, wherein the spindle axis is located to the rear of the shock absorber axis. In either case, it has been found that when landing and taxiing, the wheel 10 is subjected to lateral forces tending, in the single spindle construction, to cause lateral oscillations or shimmy of the wheel. In the present double spindle construction, the lateral forces to which the wheel 10 is subjected are transmitted to the cylinder 15, causing it to swing slightly around the axis B—B, thereby dampening the effect of the forces acting on the wheel 10 and eliminating its lateral oscillations.

By mounting the wheel spindle within the lower end of the cylinder 16, the shock absorber or support of the wheel can be made entirely of tubing without necessitating the welding or forging of a boss extending laterally from the shock absorber as heretofore provided for wheel mountings of the single spindle type, thereby resulting in a more compact and streamlined assembly of simple construction.

By rigidly securing the bushing 37 to the cylinder 16, by either the cap screws 50 or the key 53, it is possible to use the sliding bearing 27 as a self-centering device cooperating with the head 36 for locating the wheel 10 in the proper position preparatory to landing.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a landing gear for aircraft, a shock absorber including upper and lower telescoping cylinders the lower one being capable of swivel relative to the upper one, the lower end portion of the lower cylinder being of tubular cross section bent in offset relation with the center axis of the shock absorber and extending substantially parallel thereto, a wheel carrying knuckle, and a swivel connection between said cylinder and knuckle including a spindle operatively mounted within the lower end portion of said cylinder, the angle measured between the rear side of the center axis of each swivel relative to the craft and the ground when the craft rests on the ground being less than 90°.

2. In a landing gear for aircraft, a shock absorber including upper and lower telescoping cylinders the lower one being capable of swivel relative to the upper one, the lower part of the lower cylinder forming a continuous tubular portion having its inner end coaxial with and its outer end parallel to the center axis of the upper cylinder, a wheel carrying knuckle, and a swivel connection between said tubular portion and knuckle including a spindle carried by said knuckle, the rear side of the center axis of each swivel relative to the craft forming with the ground when the craft rests on the ground an acute angle.

3. In a landing gear for aircraft, a shock absorber including upper and lower telescoping cylinders capable of relative rotation, the lower cylinder being formed with a smooth tubular lower end portion extending from the upper cylinder in offset relation with the center axis thereof, a wheel carrying knuckle, and a spindle for said knuckle operatively mounted within the smooth offset end portion of the lower cylinder for rotation on its own axis and around the center axis of the shock absorber upon relative rotation of said cylinders, the angle measured between the rear side of each of said center axis relative to the craft and the ground when the craft rests on the ground being less than 90°.

4. A castor for aircraft including a plurality of spindles one comprising an elongated tubular member depending from the craft, another spindle operatively mounted within the lower end portion of said member, and a double bend intermediate the ends of said member enabling rotation of the lower portion of said member around the longitudinal center axis of the upper portion thereof, the rear side of the center axis of each spindle relative to the craft forming with the ground when the craft rests on the ground an acute angle.

5. A caster for aircraft including a support secured to the craft, an elongated tubular member depending from said support, the upper end portion of said member forming a spindle journaled within said support, a second spindle within the lower end portion of said member, and a double bend intermediate the ends of said member enabling rotation of said second spindle around the longitudinal center axis of the first spindle, the rear side of the center axis of each spindle relative to the craft forming with the ground when the craft rests on the ground an acute angle.

EPHRAIM W. CLEVELAND.